3,234,087
COCCIDIOSIS CONTROL COMPOSITIONS AND
METHODS OF USING SAME
George R. Haynes and Marvin Legator, Modesto, Calif., assignors to Shell Oil Company, New York, N.Y., a corporation of Delaware
No Drawing. Filed June 7, 1962, Ser. No. 200,627
6 Claims. (Cl. 167—53)

This invention relates generally to microbiocidal dithiocarbamates. It is particularly concerned with the prevention and treatment of disease caused by microorganisms with novel aryl aliphatic-dithiocarbamates, the use of these dithiocarbamates as microbiocides, especially coccidiostats, and with novel compositions containing such dithiocarbamates.

Coccidiosis is a common and widespread poultry disease caused by microorganisms, that is, several species of protozoan parasites of the genus Eimeria, such as *E. tenella, E. necatrix, E. acervuline, E. maxima, E. hagani* and *E. brunetti*. *E. tenella* is the causative agent of a severe and often fatal infection of the caeca of chickens, which is manifested by severe and extensive hemorrhage, accumulation of blood in the caeca, passage of blood in the droppings. *E. necatrix* attacks the small intestine of the chick causing what is known as intestinal coccidiosis. Related species of coccidia such as *E. meleagridis* and *E. adenoides* are causative organisms of coccidiosis in turkeys. When left untreated, the severe forms of coccidiosis lead to poor weight gain, reduced feed efficiency and high mortality in fowl. The elimination or control of this disease is, therefore, of paramount importance to the poultry raising industry. Coccidiosis also effects animals as well as poultry, for example, *E. zurnii, E. bovis* and *E. ellipsoidalis* are species of coccidia which have been described from cattle. There also appear to be at least seven valid species of coccidiosis in sheep and goats and at least six species of coccidiosis in swine. So it may be seen that there is also a need for effective coccidiostats in the animal raising industry.

A principal object of the present invention, therefore, is provided microbiocidal dithiocarbamates useful for treatment of disease caused by microorganisms. Another object is to provide a new method for preventing and controlling coccidiosis. It is a further object to provide novel compositions which, when added to poultry and animal feedstuffs, are extremely effective in preventing coccidiosis. A still further object is the provision of poultry and animal feedstuffs containing aryl aliphatic-dithiocarbamates.

It has now been found that certain aryl aliphatic-dithiocarbamates, more particularly, aryl esters of aliphatic-dithiocarbamic acids, are very active against protozoa which causes coccidiosis, especially in poultry. These compounds may also be useful in the treatment of coccidiosis in animals. As discussed more fully hereinbelow the development of coccidiosis is prevented when small amounts of these esters are fed to poultry.

The aryl (substituted and unsubstituted) esters of aliphatic-dithiocarbamic acids of this invention may be represented by the formula

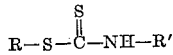

wherein R represents aryl which may be unsubstituted or substituted with simple substituents such as, for example, halo, nitro, amino, alkyl, alkoxy and hydroxy; and R′ represents aliphatic (acyclic and alicyclic) i.e., alkyl, cycloalkyl, alkenyl, cycloalkenyl, and alkynyl which may be substituted with simple substituents such as, for example, halo, nitro, amino, cyano and hydroxy. The aryl group contains from 6 to 14 ring carbon atoms, alkyl from 1 to 10 carbon atoms, cycloalkyl from 3 to 8 carbon atoms, alkenyl from 2 to 10 carbon atoms, cycloalkenyl from 3 to 8 carbon atoms, and alkynyl from 2 to 10 carbon atoms. The preferred class of esters are those wherein R represents phenyl and R′ represents alkyl or alkenyl, particularly unsubstituted phenyl, unsubstituted alkyl and mono-substituted alkenyl. Of this class of esters, those containing alkyl and alkenyl groups of up to 5 carbon atoms are most preferred.

Representative aryl esters of aliphatic-dithiocarbamic acids, i.e., aryl aliphatic-dithiocarbamates, include, for example, phenyl methyldithiocarbamate, p-chlorophenyl methyldithiocarbamate, 2,4,5-trichlorophenyl methyldithiocarbamate, p-tolyl methyldithiocarbamate, 2-chloro-4-methylphenyl ethyldithiocarbamate, p-tert-butylphenyl methyldithiocarbamate, o - chlorophenylmethyldithiocarbamate, pentachlorophenyl methyldithiocarbamate, xylyl methyldithiocarbamate, o - tolyl methyldithiocarbamate, phenyl allyldithiocarbamate, phenyl vinyldithiocarbamate, phenyl propenyldithiocarbamate, phenyl 1-butenyldithiocarbamate, phenyl 2-pentenyldithiocarbamate, phenyl 2,4-cyclohexadienyldithiocarbamate, phenyl cyclopropenyldithiocarbamate, phenyl 1-cycloheptenyldithiocarbamate, p-aminophenyl methyldithiocarbamate, p - bromophenyl methyldithiocarbamate, m-iodophenyl ethyldithiocarbamate, m-fluorophenyl methyldithiocarbamate, 2-chloro-4-bromophenyl methyldithiocarbamate, 2,4,5 - tribromophenyl methyldithiocarbamate, 2,4,5-triiodophenyl methyldithiocarbamate, p-nitrophenyl methyldithiocarbamate, 2,4,5 - trinitrophenyl methyldithiocarbamate, 2,4,5 - triaminophenyl methyldithiocarbamate, 2,3,4-trichlorophenylmethyldithiocarbamate, 3,4,5-tribromophenyl methyldithiocarbamate, p-chlorophenyl ethyldithiocarbamate, p-bromophenyl propyldithiocarbamate, p-tolyl isopropyldithiocarbamate, xylyl butyldithiocarbamate, p-tolyl isobutyldithiocarbamate, 2,4,5 trichlorophenyl pentyldithiocarbamate, 2,4,5 - tribromophenyl hexyldithiocarbamate, 3,4,5-triiodophenyl heptyldithiocarbamate, phenyl ethyldithiocarbamate, phenyl propyldithiocarbamate, phenyl butyldithiocarbamate, phenyl hexyldithiocarbamate, phenyl heptyldithiocarbamate, phenyl octyldithiocarbamate, p-tert-pentylphenyl cyclohexyldithiocarbamate, 2-naphthyl methyldithiocarbamate, 2-naphthyl ethyldithiocarbamate, 2-naphthyl allyldithiocarbamate, 1-naphthyl vinyldithiocarbamate, 2-naphthyl cyclopropyldithiocarbamate, 2-naphthyl 2-pentenyldithiocarbamate, 2-anthryl methyldithiocarbamate, 2-anthryl vinyldithiocarbamate, 1-anthryl allyldithiocarbamate, 2-anthryl cyclopropyldithiocarbamate, 2-anthryl 1-butynyldithiocarbamate, and the like.

In accordance with the present invention, it has been discovered that aryl esters of aliphatic-dithiocarbamic acids are potent coccidiostats for preventing the development of coccidiosis when administered to poultry. These new coccidiostats are conveniently fed to poultry as a component of the feed of the poultry although they may also be given alone dissolved or suspended in the drinking water. According to a preferred aspect of the invention, novel compositions for the treatment of coccidiosis are provided which comprise the aryl aliphatic-dithiocarbamates intimately dispersed in or intimately admixed with an inert edible carrier or diluent. By an inert edible carrier or diluent is meant one that is nonreactive with the active compounds and that may be administered with safety to the poultry to be treated. The carrier or diluent is preferably one that is or may be an ingredient of the poultry feed.

The compositions which are a preferred feature of this invention are the so-called feed supplements in which the aryl aliphatic-dithiocarbamates are present in relatively large amounts and which are suitable for addition to the poultry feed either directly or after an intermediate dilution or blending step. Examples of carriers or diluents suitable for such compositions are poultry feed ingredients such as distillers' dried grains, corn meal, citrus meal, fermentation residues, ground oyster shells, Attapulgus clay, wheat shorts, molasses solubles, corncob meal, edible vegetable substances, toasted dehulled soya flour, soybean mill feed, antibiotic mycelia soya grits, crushed limestone and the like. The aryl aliphatic-dithiocarbamate is intimately dispersed or admixed throughout the solid inert carrier by methods such as grinding, stirring, milling or tumbling. By selecting proper diluents and by altering the ratio of carrier to active ingredient, compositions of any desired concentration may be prepared. Formulations containing from about 0.1% to about 10% by weight, and preferably from about 0.3% to about 5% by weight of aryl aliphatic-dithiocarbamate are particularly suitable for addition to poultry feedstuffs; those having from about 0.4% to about 1% by weight of coccidiostat are very satisfactory. The active compound is usually dispersed or mixed uniformly in the diluent but in some instances may be sorbed on the carrier. Since it is convenient for the feed manufacturer to use about one pound of feed supplement for each ton of finished feed, the preferred concentration in the supplement is usually a function of the level of active ingredient desired in the finished feed.

Very low levels of aryl aliphatic-dithiocarbamates in poultry feed are sufficient to afford the poultry good protection against coccidiosis. Preferably the compound is administered to chickens in an amount equal to about 50 p.p.m. to about 600 p.p.m. of the daily feed intake. Optimum results are obtained by feeding at a level of about 200 p.p.m. to about 400 p.p.m. of the finished feed. For therapeutic treatment of an established coccidial infection, higher amounts of aryl aliphatic-dithiocarbamate, i.e., up to about 10 p.p.m. to about 1000 p.p.m. weight of the feed consumed, may be employed. The most advantageous dosage level will, of course, vary somewhat with particular circumstances such as the type and severity of the coccidial infection to be treated.

For treating poultry, the feed supplement is uniformly dispersed in the poultry feed by suitable mixing or blending procedures. The finished feed is one that contains a source of fat, protein, carbohydrate, minerals, vitamins and other nutritional factors as well as the aryl aliphatic-dithiocarbamate.

In the above discussion of this invention, emphasis has been placed on solid compositions wherein the active ingredient is mixed with an edible carrier in a feed supplement, in a so-called premix or in the final poultry feedstuff. This is the preferred method of administering compounds of this invention. An alternate method of treatment is to dissolve or suspend the aryl aliphatic-dithiocarbamate in the drinking water of the poultry. The quantity of coccidiostat which may be administer in this fashion is, of course, limited by the solubility of the product in water or by the quantity that may be suspended in the water without undue settling. Emulsifiers or surface active agents may be employed for this latter purpose.

This invention is not limited to coccidiostatic compositions having only one aryl aliphatic-dithiocarbamate as the sole active ingredient. Also contemplated within its scope is what might be called "combined treatment" where two or more of the coccidiostats of this invention are used together, or where one, two, or more of the coccidiostats of this invention are administered concurrently with other coccidiostats. For such purposes, compositions may be prepared containing, for example, phenyl methyldithiocarbamate and p-chlorophenyl methyldithiocarbamate together, or phenyl methyldithiocarbamate admixed with one or more other known coccidiostats such as sulfaquinoxaline, 4,4'-dinitrocarbanilide-2-hydroxy-4,6-dimethylpyrimidine complex, 3,3'-dinitrodiphenyldisulfide, arsanilic acid, 3-amino-4-hydroxy-phenylarsonic acid, 5-nitrofurfural semicarbazone, and the like.

It will likewise be understood by those skilled in this art that special feed supplement formulations and finished poultry feeds containing vitamins, antibiotics, growth-promoting agents and other nutritional substances may include the aryl aliphatic-dithiocarbamates of this invention. A typical product of this type is the following:

| Ingredient: | Amount/lb. of supplement, milligrams |
|---|---|
| Riboflavin | 0.64 |
| DL–calcium pantothenate | 2.10 |
| Niacin | 3.67 |
| Choline chloride | 50.00 |
| Vitamin $B_{12}$ concentrate | 1.30 |
| Procaine penicillin | 0.84 |
| Vitamin A (100,000 $\mu$/g.) | 3.38 |
| Vitamin $D_3$ (200,000 $\mu$/g.) | 0.68 |
| Arsanilic acid | 18.36 |
| Butylated hydroxy toluene | 23.15 |
| DL–methionine | 23.15 |
| Phenyl methyldithiocarbamate | 100.00 |
| Distillers' grains to 1 pound. | |

An especially active coccidiostat of this invention is phenyl methyldithiocarbamate. This compound has been effective in controlling *E. tenella* in test chicks when administered in feed at concentration in the range of 50 to 200 parts per million. For example, Table I hereinafter compares the known coccidiostat, sulfaquinoxaline with phenyl methyldithiocarbamate.

Briefly, the novel aryl aliphatic-dithiocarbamates can be prepared by reacting an aliphatic-isothiocyanate with a corresponding aryl mercaptan according to the following equation:

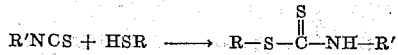

wherein R and R' are as herein defined.

The following specific examples illustrate the preparation of typical aryl aliphatic-dithiocarbamates within the purview of this invention.

EXAMPLE I.—p-CHLOROPHENYL METHYL-DITHIOCARBAMATE

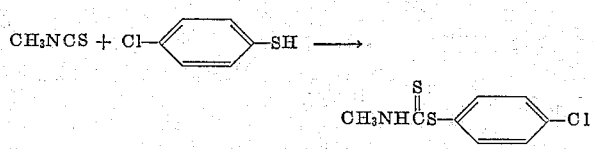

A solution of 18.3 g. (0.25 mole) of methyl isothiocyanate is 50 ml. of ether was added to a solution of 36.1 g. (0.25 mole) of p-chlorophenyl mercapatan in 100 ml. of ether. The reaction mixture was allowed to stand overnight.

Two drops of pyridine was added and the mixture was heated at reflux for two hours. It was then irradiated with light from a nunfrosted light bulb for 3 hours. The ether was distilled from the reaction flask and the reaction mixture was heated on the steam bath for 4 hours and allowed to cool. Upon standing overnight the mixture solidified to a white crystalline mass. This material was recrystallized from hexane to yield 43 g. M.P. 113–114°, of p-chlorophenyl methyldithiocarbamate as white needles.

*Analysis.*—Calculated: N, 6.4%; Cl, 16.3%. Found: N, 6.4%; Cl, 16.4%.

EXAMPLE II.—2,4,5-TRICHLOROPHENYL METHYLDITHIOCARBAMATE

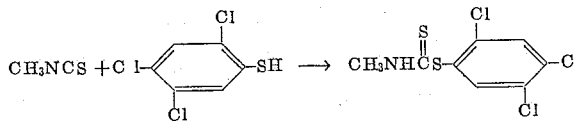

A solution of 21.4 g. (0.1 mole) of 2,4,5-trichlorophenyl mercaptan and 7.3 g. (0.1 mole) of methyl isothiocyanate in 100 ml. of anhydrous ether was allowed to stand at room temperature. The ether was distilled to leave a liquid residue which solidified. Recrystallization from isopropyl alcohol gave crystals of 2,4,5-trichlorophenyl methyldithiocarbamate, M.P. 140–142°; yield 16 g. (55%).

*Analysis.*—Calculated: N, 4.9%; Cl, 37.2%. Found: N, 4.7%; Cl, 37.0%.

EXAMPLE III.—p-TOLYL METHYLDITHIOCARBAMATE

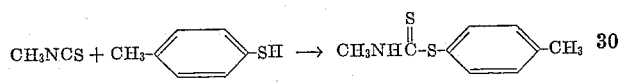

A solution of 24.8 g. (0.2 mole) of p-tolyl mercaptan and 14.6 g. (0.2 mole) of methyl isothiocyanate in 150 ml. of anhydrous ether was allowed to stand at room temperature. The ether was distilled leaving a residue which crystallized on standing. This material was recrystallized from hexane to yield 38 g. (96%), M.P. 93°, of p-tolyl methyldithiocarbamate.

*Analysis.*—Calculated: N, 7.1%; S, 32.5%. Found: N, 6.8%; S, 32.9%.

EXAMPLE IV.—p-TERT-BUTYLPHENYL METHYLDITHIOCARBAMATE

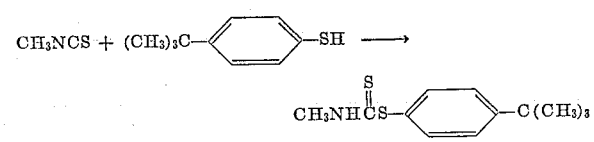

A solution of 33.2 g. (0.2 mole) of p-tert-butylphenyl mercaptan and 14.6 g. (0.2 mole) of methyl isothiocyanate in 100 ml. of ether (anhyd.) was allowed to stand at room temperature. The ether was distilled to leave a liquid residue. This residue slowly deposited crystals on standing. This semisolid mixture of liquid and solvent was taken up in hexane and chilled to yield p-tert-butylphenyl methyldithiocarbamate as white needles, M.P. 154–6°, with a yield of 9 g. (20%).

*Analysis.*—Calculated: N, 5.9%; S, 26.8%. Found: N, 5.7%; S, 27.6%.

EXAMPLE V.—o-CHLOROPHENYL METHYLDITHIOCARBAMATE

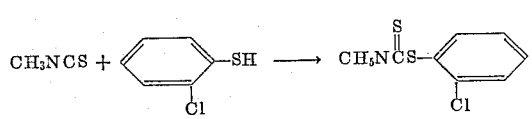

A solution of 41.1 g. (0.284 mole) of o-chlorophenyl mercaptan and 21.2 (0.29 mole) of methyl isothiocyanate in 150 ml. of ether was allowed to stand at room temperature for 16 hours and the ether was then distilled. The residue very slowly crystallized. Recrystallization from hexane yielded o-chlorophenyl methyldithiocarbamate as white needles melting at 86–8°; yield 30 g. (50%).

*Analysis.*—Calculated: N, 6.4%; Cl, 16.3%. Found: N, 6.3%; Cl, 16.4%.

EXAMPLE VI.—PHENYL METHYLDITHIOCARBAMATE

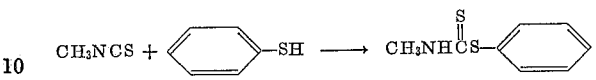

A solution of 22 g. (0.2 mole) of phenyl mercaptan and 14.6 g. (0.2 mole) of methyl isothiocyanate in 100 ml. of ether was allowed to stand for 16 hours at room temperature. The solution was then heated at reflux for 3 hours and the ether was distilled. The residue which crystallized on cooling was recrystallized from isopropyl alcohol to yield 33 g. (90%), M.P. 124°, of phenyl methyldithiocarbamate.

*Analysis.*—Calculated: N, 7.7%; S, 35.0%. Found: N, 7.5%; S, 35.0%.

EXAMPLE VII.—PENTACHLOROPHENYL METHYLDITHIOCARBAMATE

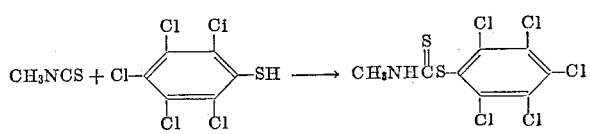

A mixture of 28.3 g. (0.1 mole) of pentachlorophenyl mercaptan and 7.3 g. (0.1 mole) of methyl isothiocyanate in 800 ml. of anhydrous ether was allowed to stand at room temperature for 16 hours. All of the mercaptan did not dissolve. The mixture was stirred at reflux for 15 hours and the ether was distilled to leave a powdery solid. This solid was pentachlorophenyl methyldithiocarbamate.

*Analysis.*—Calculated: Cl, 49.9%; N, 3.9%; S, 18.0%. Found: Cl, 49.7%, 49.7%; N, 3.3%, 3.2%; S, 18.6%.

EXAMPLE VIII.—XYLYL METHYLDITHIOCARBAMATE

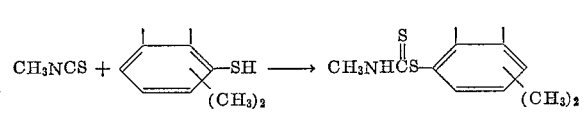

A solution of 20 g. (0.145 mole) of xylyl mercaptan and 10.6 g. (0.145 mole) of methyl isothiocyanate in 150 ml. of anhydrous ether was stirred at room temperature for 4 hours. The ether was removed by distillation to leave a viscous liquid. The liquid was stripped at 0.3 mm. on a steam bath. The residue slowly crystallized as 25 g. of xylyl methyldithiocarbamate (83% of Theor).

*Analysis.*—Calculated for $NS_2C_{10}H_{13}$: S, 30.3%; N, 6.6%. Found: S, 27.9%; N, 6.4%.

EXAMPLE IX.—o-TOLYL METHYLDITHIOCARBAMATE

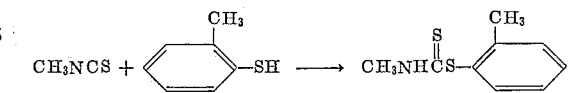

A solution of 24.8 g. (0.2 mole) of o-tolyl mercaptan and 14.6 g. (0.2 mole) of methyl isothiocyanate in 100 ml. of ether was stirred at room temperature for 6 hours. Evaporation of the ether left a white crystalline solid. This solid was recryst. from hexane to yield 36 g. of o-tolyl methyldithiocarbamate as white needles, M.P. 89–90°, (90%).

*Analysis.*—Calculated for $NS_2C_9H_{11}$: S, 32.5%; N, 7.1%. Found: S, 32.0%; N, 7.0%.

EXAMPLE X.—PHENYL (2-CYANOALLYL)-DITHIOCARBAMATE

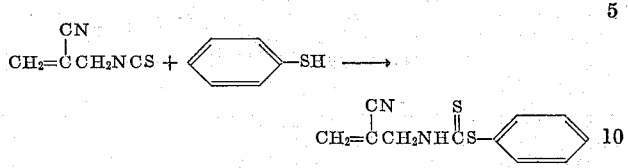

A solution of 22.0 g. (0.2 mole) of benzenethiol and 10 ml. of pyridine in 60 ml. of anhydrous ether was cooled in an ice bath while 24.8 g. (0.2 mole) of 2-cyanoallyl isothiocyanate was added. This solution deposited a crystalline precipitate upon standing a few hours at room temperature. This precipitate was filtered and recrystallized from methanol to yield 31 g. (67%), M.P. 106–8°, of phenyl (2-cyanoallyl)-dithiocarbamate.

*Analysis.*—Calculated: N, 12.0%; S, 27.4%. Found: N, 12.1%; S, 27.2%.

EXAMPLE XI.—2-NAPHTHYL METHYLDITHIOCARBAMATE

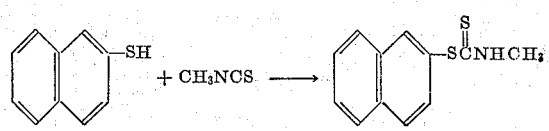

A solution of 23.0 g. (0.14 mole) of 2-naphthalenethiol, 11.0 g. (0.15 mole) of methyl isothiocyanate and 10 ml. of pyridine in 50 ml. of anhydrous ether was allowed to stand overnight at room temperature. A white precipitate formed which was filtered and recrystallized from isopropyl alcohol. The yield of recrystallized product was 26 g. (80%), M.P. 128–129°.

*Analysis.*—Calculated: N, 5.9%; S, 27.1%. Found: N, 6.0%; S, 28.1%.

The following specific examples illustrate compositions containing the novel active ingredients of this invention. Animal and poultry feed supplements having the following compositions are prepared by intimately mixing, for example, phenyl methyldithiocarbamate and the particular edible solid diluent or diluents:

| | Pounds |
|---|---|
| Phenyl methyldithiocarbamate | 7.5 |
| Distillers' dried grains | 92.5 |
| Phenyl methyldithiocarbamate | 5.0 |
| Soybean mill feed | 50.0 |
| Fine soya grits | 45.0 |
| Phenyl methyldithiocarbamate | 10.0 |
| Molasses solubles | 90.0 |
| Phenyl methyldithiocarbamate | 15.0 |
| Corn distillers' grains | 55.0 |
| Corn germ meal | 30.0 |
| p-Chlorophenyl methyldithiocarbamate | 20.0 |
| Wheat shorts | 30.0 |
| Distillers' dried grains | 50.0 |
| o-Tolyl methyldithiocarbamate | 25.0 |
| Corn distillers' dried grains | 75.0 |
| 2,4,5-trichlorophenyl methyldithiocarbamate | 40.0 |
| Corn meal | 60.0 |
| p-Aminophenyl methyldithiocarbamate | 10.0 |
| Nicarbazin | 15.0 |
| Corn distillers' dried grains | 75.0 |

These supplements are made by mechanical milling or mixing of the ingredients to insure uniform distribution of the active compound.

The following specific example illustrates the effectiveness of the coccidiostats of this invention.

EXAMPLE XII.—PHENYL METHYLDITHIOCARBAMATE AND PHENYL (2-CYANOALLYL)-DITHIOCARBAMATE

Groups of 10-day old chicks were fed a mash diet containing 100 to 400 p.p.m. of phenyl methyldithiocarbamate uniformly dispersed in the feed. After having been on this ration for 24 hours, each bird was inoculated with 1 cc. of sporulated oocysts of *E. tenella*, other groups of 10-day old chicks were fed a similar mash diet containing no phenyl methyldithiocarbamate. These were also infected after 24 hours and served as controls. Still other groups of 10-day old chicks were fed the mash diet free of phenyl methyldithiocarbamate and were not infected with coccidiosis. These served as normal controls. A like test was run using phenyl (2-cyanoallyl)dithiocarbamate as the coccidiostat.

The experiments were completed on the seventh day after injection. During the seven-day period the infected birds were observed for clinical evidence of coccidiosis. The surviving birds were weighed, sacrificed and examined for cecal coccidiosis.

The following results were obtained:

*Table I*

| | Concentration in Feed (p.p.m.) | Mortality (percent) | Weight Increase per bird (grams) | Evidence of Coccidiosis, day bleeding after inoculation [a] | | |
|---|---|---|---|---|---|---|
| | | | | 4th | 5th | 6th |
| Inoculated chick | 0 | 50 | | 0 | M | H |
| Non-inoculated chick | 0 | 0 | 49 | 0 | 0 | 0 |
| Sulfaquinoxaline | 125 | 25 | 33 | 0 | M | H |
| Do | 125 | 12 | 23 | 0 | S | M |
| Phenyl methyldithiocarbamate | 50 | 0 | 45 | 0 | M | M |
| Do | 100 | 0 | 49 | 0 | M | S |
| Do | 200 | 0 | 41 | 0 | 0 | 0 |
| Do | 400 | 0 | 41 | 0 | 0 | 0 |
| Phenyl (2-cyanoallyl) dithiocarbamate | 200 | 0 | 50 | 0 | S | 0 |

[a] Amount of Bleeding: S=Small, M=Medium, H=High.

In Table I, it may be seen that birds receiving phenyl methyldithiocarbamate at all concentrations were superior in weight gain and reduced mortality over those birds receiving sulfaquinoxaline. It may be seen that no evidence of coccidiosis, e.g., bleeding, could be found in birds given phenyl methyldithiocarbamate at 200 p.p.m. and 400 p.p.m. in contrast to those given sulfaquinoxaline at 125 p.p.m. It also may be seen that phenyl (2-cyanoallyl) dithiocarbamate at 200 p.p.m. showed a weight increase of 50 g./bird with only a small amount of bleeding on the 5th day.

Although the present invention is primarily directed to the use of these aryl aliphatic-dithiocarbamates as coccidiostats, they are also useful in controlling a variety of yeasts, fungi and bacteria as shown by Table II hereinbelow; therefore, these uses also form a part of this invention.

Table II

| Dithiocarbamate | Yeast | Fungi | | | | Bacteria | | | | | | | | |
|---|---|---|---|---|---|---|---|---|---|---|---|---|---|---|
| | C. Albicans | V. Alboatrum | P. Italicum | C. Globosum | S. Rolfsii | M. Avium | S. Aureus | B. Subtilus | L. Mesenteroides | K. Pneumoniae | P. Aeruginosa | P. Vulgaris | S. Gallinarum | E. Coli |
| p-Chlorophenyl methyldithiocarbamate | 0 | 0 | 0 | 0 | --- | 0 | --- | 0 | + | --- | 0 | --- | --- | 0 |
| 2,4,5-Trichlorophenyl methyldithiocarbamate | --- | 0 | --- | 0 | 0 | --- | --- | 0 | 0 | --- | 0 | 0 | --- | 0 |
| p-Tolyl methyldithiocarbamate | --- | 0 | --- | 0 | 0 | --- | --- | 0 | 0 | --- | 0 | 0 | --- | 0 |
| p-Tert-butylphenyl methyldithiocarbamate | --- | 0 | --- | 0 | 0 | --- | --- | 0 | 0 | --- | 0 | 0 | --- | 0 |
| Phenyl methyldithiocarbamate | --- | 0 | --- | 0 | 0 | --- | --- | 0 | 0 | --- | 0 | 0 | --- | 0 |
| Pentachlorophenyl methyldithiocarbamate | --- | 0 | --- | 0 | 0 | 0 | --- | 0 | 0 | 0 | 0 | 0 | --- | 0 |
| Xylyl methyldithiocarbamate | 0 | --- | --- | + | + | + | ± | ± | --- | ± | ± | ± | --- | ± |
| o-Tolyl methyldithiocarbamate | 0 | --- | --- | 0 | + | ± | 0 | 0 | --- | 0 | 0 | --- | + | + |

Legend:
0=complete control at 50 p.p.m.
±=partial control at 50 p.p.m.
+=no control at 50 p.p.m.

It is to be understood that this invention is not to be limited to the exact details of operation shown and described, as obvious modifications and equivalents will be apparent to one skilled in the art and the invention is, therefore, limited only by the scope of the appended claims.

We claim as our invention:

1. A method of treating coccidiosis in animals and poultry which comprises oral administration of an effective quantity of a dithiocarbamate of the formula:

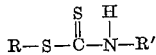

wherein
R is a member of the group consisting of phenyl and phenyl substituted by at least one member of the group consisting of halogen, nitro, amino, alkyl of 1 to 5 carbon atoms, alkoxy of 1 to 5 carbon atoms and hydroxy; and
R′ is a member of the group consisting of unsubstituted alkyl of 1 to 5 carbon atoms and alkenyl of 2 to 5 carbon atoms substituted by one member of the group consisting of halogen, nitro, amino, cyano and hydroxy.

2. A method of treating coccidiosis in animals and poultry which comprises oral administration of an effective quantity of S-phenyl N-methyl-dithiocarbamate.

3. A method of treating coccidiosis in poultry which comprises oral administration in the feed of at least 50 parts per million by weight of feed of an dithiocarbamate of the formula:

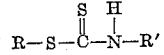

wherein
R is a member of the group consisting of phenyl and phenyl substituted by at least one member of the group consisting of halogen, nitro, amino, alkyl of 1 to 5 carbon atoms, alkoxy of 1 to 5 carbon atoms and hydroxy; and
R′ is a member of the group consisting of unsubstituted alkyl of 1 to 5 carbon atoms and alkenyl of 2 to 5 carbon atoms substituted by one member of the group consisting of halogen, nitro, amino, cyano and hydroxy.

4. A method of treating coccidiosis in poultry which comprises oral administration in the feed of at least 50 parts per million by weight of feed of S-phenyl-N-methyl-dithiocarbamate.

5. A composition useful in the prevention and treatment of coccidiosis in domestic animals which comprises an animal feed and a dithiocarbamate of the formula:

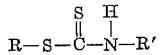

wherein
R is a member of the group consisting of phenyl and phenyl substituted by at least one member of the group consisting of halogen, nitro, amino, alkyl of 1 to 5 carbon atoms, alkoxy of 1 to 5 carbon atoms and hydroxy; and
R′ is a member of the group consisting of unsubstituted alkyl of 1 to 5 carbon atoms and alkenyl of 2 to 5 carbon atoms substituted by one member of the group consisting of halogen, nitro, amino, cyano and hydroxy, the dithiocarbamate making up from 0.1 percent to 10 percent of the total weight of the composition.

6. A composition useful in the prevention and treatment of coccidiosis in domestic animals which comprises an animal feed and S-phenyl N-methyldithiocarbamate, said dithiocarbamate making up from 0.1 percent to 10 percent of the total weight of the composition.

References Cited by the Examiner

UNITED STATES PATENTS

| Re. 22,750 | 4/1946 | Tisdale | 167—30 |
| 2,610,140 | 9/1952 | Santivasi | 167—53.1 |
| 2,628,183 | 2/1953 | Johnson | 167—53.1 |
| 2,756,249 | 7/1956 | Kirshenbaum | 260—455 |
| 2,786,866 | 3/1957 | Hook | 260—455 |
| 2,960,432 | 11/1960 | Jones | 167—30 |
| 2,990,319 | 6/1961 | Jones | 167—30 |
| 3,075,875 | 1/1963 | Margot | 167—30 |

FOREIGN PATENTS 96,797    1/1961   Netherlands.

OTHER REFERENCES

Chabrier: "Societe Chimique de France Jan.," June 1950, pages 51–65 (particularly pages 51, 58, 59, 61–65).

Links: Chem. Abst. vol. 53, 1959, pages 13486i and 13487a.

JULIAN S. LEVITT, *Primary Examiner.*

FRANK CACCIAPAGLIA, Jr., LEWIS GOTTS,
*Examiners.*